No. 725,477. PATENTED APR. 14, 1903.
O. F. PERSSON.
MOTION CHECKING DEVICE.
APPLICATION FILED SEPT. 29, 1902.
NO MODEL. 3 SHEETS—SHEET 1.

Witnesses:
Helen Orford
Alex F. Macdonald

Inventor,
Otto F. Persson,
By [signature]
Att'y.

No. 725,477. PATENTED APR. 14, 1903.
O. F. PERSSON.
MOTION CHECKING DEVICE.
APPLICATION FILED SEPT. 29, 1902.
NO MODEL. 3 SHEETS—SHEET 2.

Witnesses:
Helen Orford
Alex F. Macdonald

Inventor,
Otto F. Persson,
By Albert H. Davis
Att'y.

No. 725,477. PATENTED APR. 14, 1903.
O. F. PERSSON.
MOTION CHECKING DEVICE.
APPLICATION FILED SEPT. 29, 1902.
NO MODEL. 3 SHEETS—SHEET 3.
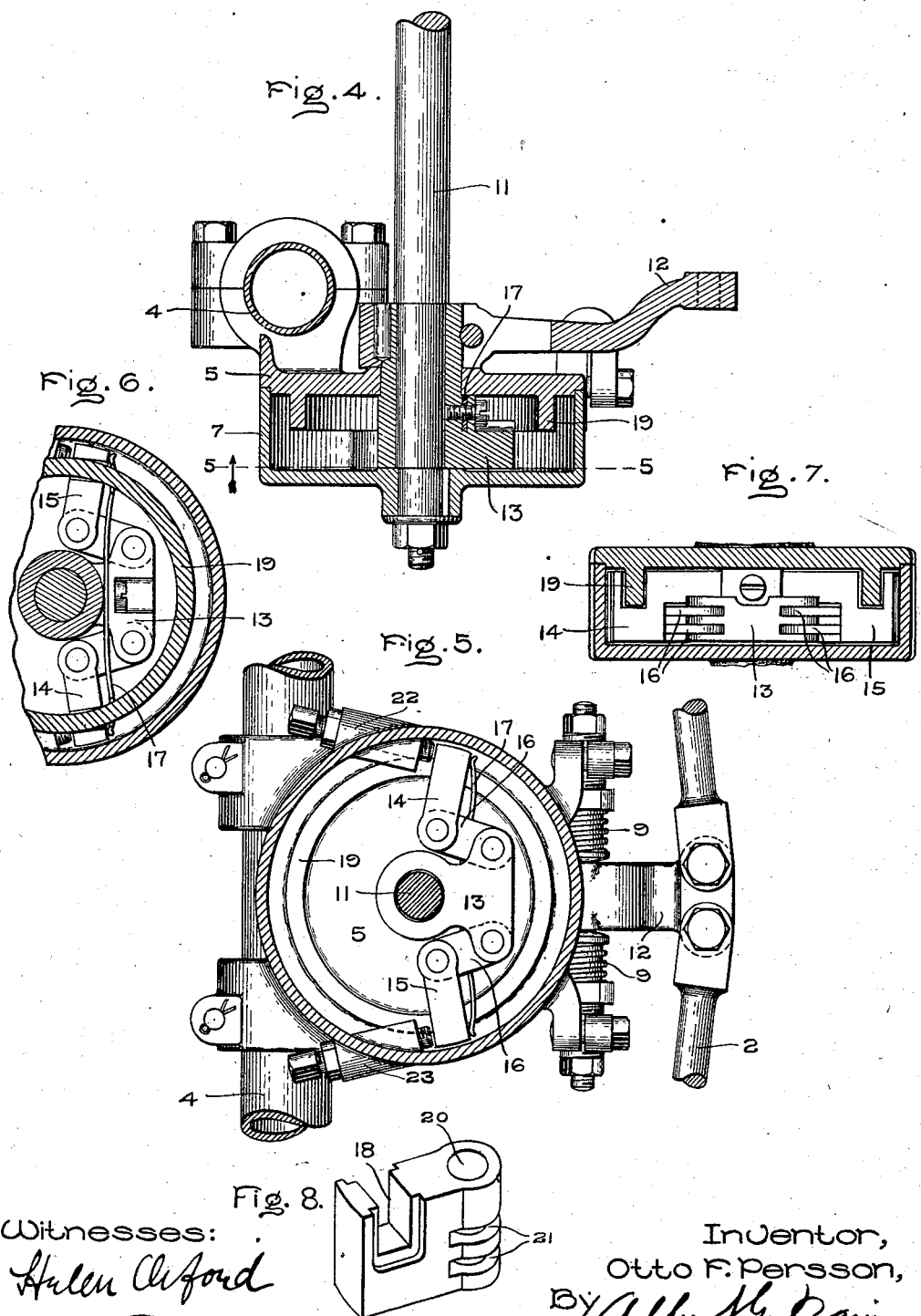

UNITED STATES PATENT OFFICE.

OTTO F. PERSSON, OF LYNN, MASSACHUSETTS, ASSIGNOR TO ELIHU THOMSON, OF SWAMPSCOTT, MASSACHUSETTS.

MOTION-CHECKING DEVICE.

SPECIFICATION forming part of Letters Patent No. 725,477, dated April 14, 1903.

Application filed September 29, 1902. Serial No. 125,211. (No model.)

*To all whom it may concern:*

Be it known that I, OTTO F. PERSSON, a citizen of the United States, residing at Lynn, county of Essex, State of Massachusetts, have invented certain new and useful Improvements in Motion-Checking Devices, of which the following is a specification.

The present invention relates to motion-checking devices, and has for its object to provide a check which is light and strong in construction and at the same time smooth and reliable in its operation. For a consideration of what I consider to be novel and my invention attention is called to the specification and claims appended thereto.

Figure 1:
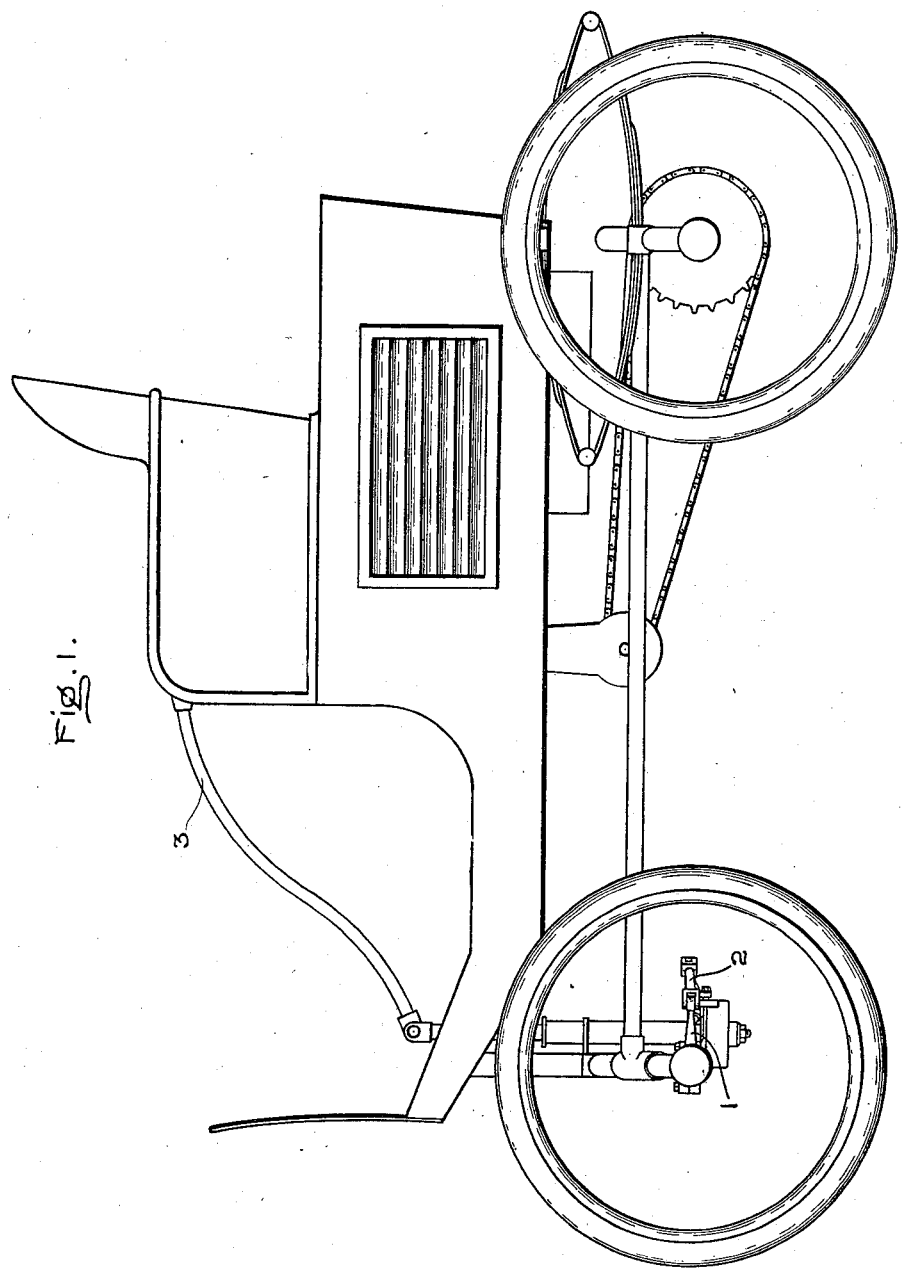
Figure 2:
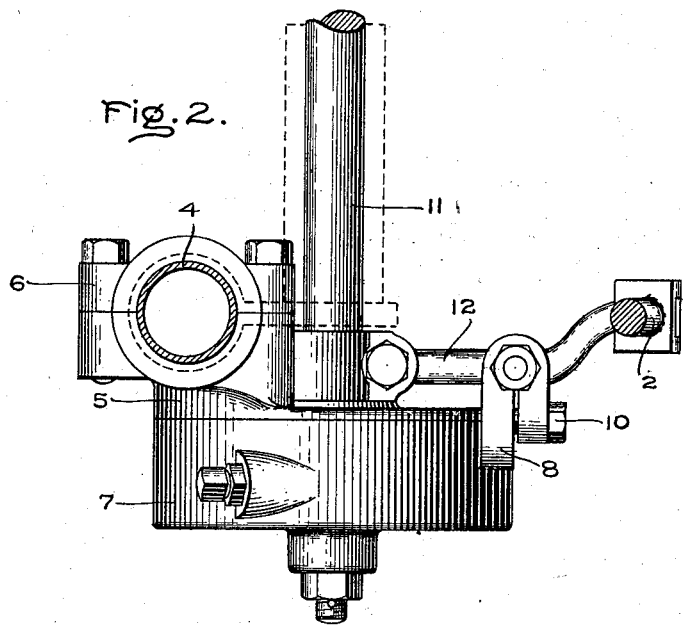
Figure 3:
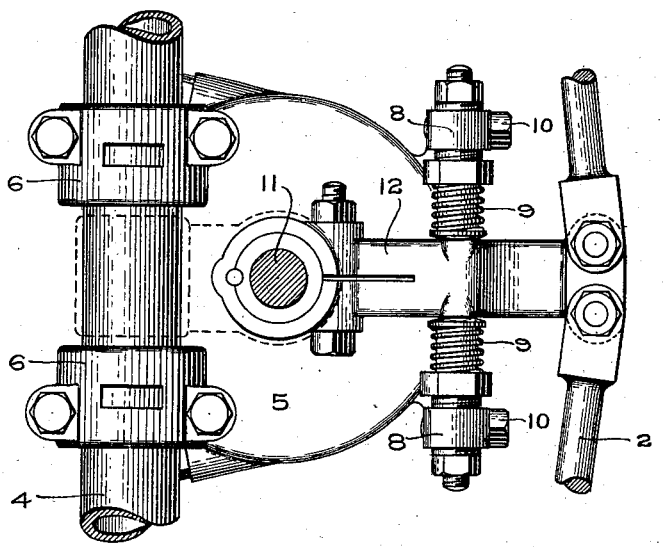

In the accompanying drawings, which show one embodiment of my invention, Figure 1 is a side elevation of an automobile. Fig. 2 is a side elevation of the check. Fig. 3 is a plan view of the check. Fig. 4 is a vertical section thereof. Fig. 5 is a horizontal section taken on line 5 5 of Fig. 4 looking in the direction of the arrow. Fig. 6 is a partial horizontal section as viewed from a point above the check. Fig. 7 is a transverse section showing the friction-dogs in their operative position, and Fig. 8 is a perspective view of one of the locking-dogs.

Referring to Fig. 1, I have shown a self-propelled vehicle of any suitable construction having an engine that is connected to the driving-wheels. The steering-wheels are mounted on stub-axles 1, which are connected by rods 2 with the steering-check. The object of the check is to prevent the transmission of road-thrusts to the steering-handle 3. In the drawings I have shown the well-known form of tiller steering mechanism; but other forms of steering mechanism may be used, if desired.

Referring more especially to Figs. 2 and 3, 4 represents a stationary axle, which may be solid or tubular, as occasion demands. Rigidly mounted on the axle is a plate or cover 5, having a concentric clutch surface or ring. In the present instance the plate is retained in place by caps 6, the latter being secured by suitable bolts. Situated below the plate is a cup-shaped casing 7, that moves with the steering-wheels and incloses the working parts of the check. Formed integrally with the casing or otherwise secured thereto are lugs 8, which are designed to receive the spring-pressed buffers 9. The lugs are split, and extending transversely through the split part of each is a bolt 10, by means of which the adjusting-studs for the buffers can be rigidly clamped in place. The steering-shaft 11 is movable independent of the arm 12, which arm is situated between the spring-buffers and is connected to the steering-rod 2, the latter being attached to the wheels. This forms a part of the lost-motion device whereby the locking-dogs are released when it is desired to steer.

Referring now more particularly to Figs. 4 to 8, inclusive, the internal mechanism of the checking device will be described. The cup-like casing 7 is keyed to the steering-shaft 11 and rotates therewith. It is prevented from dropping off of the shaft by a suitable nut and retaining-pin. Sleeved on the shaft and capable of moving independently thereon is a support 13, which carries the locking or clutching dogs 14 and 15. These dogs are connected to the support by links 16, two of which are provided for each dog. Between the support and the links are suitable pivots, and between the links and the dogs are other pivots, by means of which a certain freedom of movement is permitted to the dogs. The support 13 is slotted, as clearly shown in Fig. 4, to receive the flat spring 17, that tends at all times to press the dogs 14 and 15 into operative engagement with the friction-ring that is formed on or carried by the plate 5. The position of the dogs 14 and 15 with respect to the rings determines whether or not the motion-checking device is in the operative or inoperative position, as will appear hereinafter. The support 13 is provided with a hub-like extension which engages with a shoulder formed on the steering-shaft 11, and this shoulder and the nut at the lower end of the shaft prevent longitudinal movement of said shaft. The arm 12, which is connected to the steering-wheels, is rigidly secured to the hub of the support 13. From the foregoing it is apparent that movement to the wheels is imparted through the shaft 11 to the lugs 8, thence through the spring-buffers to the arm 12 and rods 2.

The construction of the dogs is well illustrated in Fig. 8, wherein 18 represents the slot that receives the hardened friction-ring 19 on the cap or cover 5. 20 represents the opening through which the pivot that secures the dog to the links passes, and 21 represents the openings for receiving the ends of the links 16. When the sides of the slot are pressed into engagement with the ring 19, as shown in Fig. 6, the parts are locked, and when they are moved out of engagement by the adjustable abutments 22 and 23 the parts are free to move. The adjustable abutments are carried by the cup-shaped casing 7. The plate or cover 5 is preferably made out of steel and the ring 19, which is formed integral therewith, case-hardened. The dogs which engage therewith are preferably made of tool-steel and hardened, so that the adjacent clutching-faces will not wear.

The action of the invention is as follows: Assume that it is desirable to steer the vehicle to the left. The operator pushes the steering-handle 3 toward the right, as is usual. This causes the adjustable abutment 23 to move into engagement with the locking-dog 15 and move it to a position where the clutching-faces on the sides of the slot are moved out of engagement with the stationary ring 19. The movement of the support 13 is in such a direction that the spring 17 tends to move the dog 14 with it, and since the shaft 11 is rigidly connected to the cup-like casing 7 it follows that as the handle moves the abutment 22 will be moved also. It is to be observed that the spring-buffers 9 are placed between the casing 7 and the arm 12 and that the connection between the steering-shaft 11 and the dog-supporting piece 13 is through said buffers. Hence a certain amount of lost motion is permitted between the shaft and the support 13, and it is during the time that this lost motion is being taken up that the dogs 14 and 15, as the case may be, are moved out of engagement with the stationary friction-ring 19. On releasing the pressure on the steering-handle 3 the spring-pressed buffers 9 center the arm 12 between them and the flat spring 17 moves the dogs 14 and 15 into operative engagement with the stationary friction-ring and the latter is gripped thereby. Motion of the wheels independent of the steering-handle is thus prevented, and all tendency to transmit road thrusts from the wheels to the handle is prevented. Assuming that an obstruction in the road tends to move the steering-wheels in a manner different from that intended during the act of steering, the dogs 14 and 15 will be thrown into operative relation with respect to the ring and said action prevented.

I have described my invention as applied to a vehicle; but the checking device can be employed in connection with other forms of apparatus wherein it is desired to check independent motion between the two parts at certain specific times and permit it at other times.

It is important to have the ring 19 situated at some distance from the center of revolution, since it decreases the leverage exerted by the wheels. It also enables me to so arrange the clutching-surfaces that the amount of wear is very slight, and, furthermore, the locking and unlocking takes place in a smooth and gradual manner and there is an absence of all jumping of the parts due to the dogs partly engaging with the friction-surfaces during the act of steering.

In accordance with the provisions of the patent statutes I have described the apparatus which I now consider to be the best embodiment of my invention; but I do not desire to be understood as limiting myself to the precise construction shown, as it is merely illustrative, the invention being capable of being carried out by other and equivalent means.

What I claim as new, and desire to secure by Letters Patent of the United States, is—

1. In a motion-checking device, the combination of a stationary support having a ring-like projection carried thereby, a movable support, dogs which are carried by the movable support and are arranged to grip the ring, a movable casing which incloses the dogs, and stops which are carried by the casing for disengaging the dogs.

2. In a motion-checking device, the combination of an axle, a plate carried thereby which is provided with a friction-surface, a shaft, a support mounted on and movable with the shaft, oppositely-acting locking-dogs mounted on the movable support and arranged to engage with the friction-surface on the stationary plate, a casting comprising a base and side wall which incloses the dogs, means carried by the casing for moving the dogs out of action, an actuator which is secured to the support, and springs for centering the actuator and permitting the dogs to operate.

3. In a motion-checking device, the combination of a support having a shaft-opening, a friction-ring carried thereby which is concentric with the opening, a shaft, a support that surrounds the shaft and extends through the opening, dogs carried by the support which are arranged to engage the ring, a casing which surrounds the dogs, stops for the dogs carried by the casing, and spring-buffers also carried by the casing which form a part of a lost-motion connection between the casing and the shaft.

4. In a motion-checking device, the combination of a stationary friction-ring, dogs arranged to engage therewith on opposite sides of the center, and a single spring which forces them into engagement with the ring.

5. In a motion-checking device, the combination of a friction-ring, a support movable independent thereof, dogs pivotally secured to the support and arranged to engage with the ring, a spring that is secured to the support and engages with the dogs on opposite sides of the center of the ring, and means for releasing the dogs.

6. In a motion-checking device, the combination of a support having a ring extending therefrom, a shaft which extends through the support, clutch-dogs, a support therefor which loosely surrounds the shaft, a casing that surrounds the dogs and is rigidly connected to the shaft, and adjustable stops for the dogs which are carried by the casing.

7. In a motion-checking device, the combination of a support having a friction-ring, slotted dogs arranged to engage therewith, a support therefor, a movable casing which incloses the ring, dogs, and support, an arm which is rigidly attached to the support for the dogs, spring-buffers carried by the casing and arranged to engage with the arm, and adjustable stops also carried by the casing.

8. In a motion-checking device, the combination of a plate or cover which is provided with a friction-ring on its under side, a means for holding the cover in a fixed position, a shaft, a casing which is rigidly secured to the shaft and engages with the under side of the plate, locking-dogs which engage with the ring, a support for the dogs, and means carried by the casing for moving the dogs out of engagement with the ring for operating the checking device.

In witness whereof I have hereunto set my hand this 25th day of September, 1902.

OTTO F. PERSSON.

Witnesses:
DUGALD McK. McKILLOP,
JOHN A. McMANUS.